US011453291B2

(12) United States Patent
    Grassl

(10) Patent No.: US 11,453,291 B2
(45) Date of Patent: Sep. 27, 2022

(54) CONTACTLESS CHARGING DEVICE, CHARGING SYSTEM AND METHOD FOR CONTACTLESSLY CHARGING AN ENERGY ACCUMULATOR OF A MOTOR VEHICLE

(71) Applicant: AUDI AG, Ingolstadt (DE)

(72) Inventor: Tobias Grassl, Denkendorf (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/970,774

(22) PCT Filed: Feb. 21, 2019

(86) PCT No.: PCT/EP2019/054300
    § 371 (c)(1),
    (2) Date: Aug. 18, 2020

(87) PCT Pub. No.: WO2019/170425
    PCT Pub. Date: Sep. 12, 2019

(65) Prior Publication Data
    US 2021/0362610 A1    Nov. 25, 2021

(30) Foreign Application Priority Data
    Mar. 7, 2018    (DE) .................... 10 2018 203 371.4

(51) Int. Cl.
    *H02J 50/10*        (2016.01)
    *H02J 7/00*         (2006.01)
    (Continued)

(52) U.S. Cl.
    CPC ............. *B60L 5/005* (2013.01); *B60L 53/12* (2019.02); *B60L 53/20* (2019.02); *H02J 7/0045* (2013.01);
    (Continued)

(58) Field of Classification Search
    CPC . B60L 53/12; B60L 53/20; H02J 50/10; H02J 7/0045
    (Continued)

(56) References Cited

U.S. PATENT DOCUMENTS

2015/0115704 A1    4/2015  Gorai et al.
2016/0114692 A1*   4/2016  Tripathi ................ B60L 3/0092
                                                        320/109
(Continued)

FOREIGN PATENT DOCUMENTS

CN      204633432 U    9/2015
DE   102015006277 A1   12/2015
(Continued)

OTHER PUBLICATIONS

English-language translation of International Preliminary Report on Patentability dated Sep. 8, 2020, in corresponding International Application No. PCT/EP2019/054300; 5 pages.
(Continued)

*Primary Examiner* — Suchin Parihar
(74) *Attorney, Agent, or Firm* — Maier & Maier, PLLC

(57) ABSTRACT

A contactless charging device for contactlessly charging an energy accumulator of a motor vehicle, wherein the contactless charging device has an interface for coupling the contactless charging device to a power source, wherein the interface is designed for communicative coupling and for wired electrical coupling to a charging station, wherein the charging station is designed for the wired charging of the energy accumulator.

12 Claims, 1 Drawing Sheet

(51) Int. Cl.
  *B60L 5/00* (2006.01)
  *B60L 53/12* (2019.01)
  *B60L 53/20* (2019.01)
  *H02J 7/02* (2016.01)

(52) U.S. Cl.
  CPC ............... *H02J 7/02* (2013.01); *H02J 50/10* (2016.02); *H02J 2207/20* (2020.01)

(58) Field of Classification Search
  USPC ........................................................ 320/108
  See application file for complete search history.

(56) References Cited

U.S. PATENT DOCUMENTS

| | | | |
|---|---|---|---|
| 2017/0197517 A1* | 7/2017 | Jamieson | B60L 53/14 |
| 2019/0077271 A1* | 3/2019 | Aviv | B60L 53/302 |

FOREIGN PATENT DOCUMENTS

| | | |
|---|---|---|
| DE | 102016116914 A1 | 3/2017 |
| EP | 2717414 A1 | 4/2014 |
| EP | 2983267 A1 | 2/2016 |
| JP | 2014-155278 A | 8/2014 |
| KR | 1020180018148 A | 2/2018 |

OTHER PUBLICATIONS

German Examination Report dated Sep. 17, 2018 in corresponding German Application No. 10 2018 203 371.4; 20 pages; Machine translation attached.

International Search Report (with English translation) and Written Opinion (with Machine translation) dated Apr. 15, 2019 in corresponding International Application No. PCT/EP2019/054300; 18 pages.

* cited by examiner

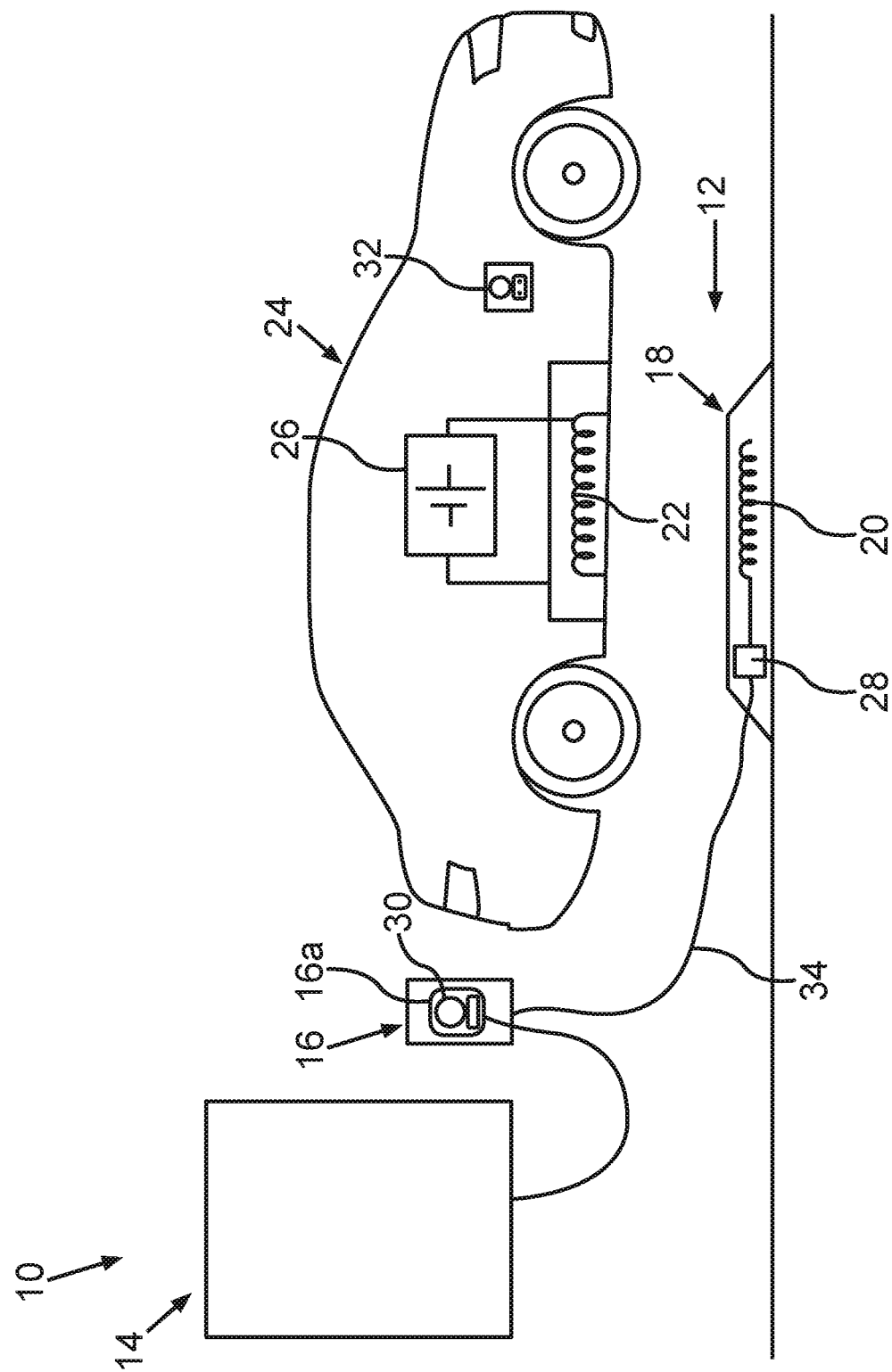

CONTACTLESS CHARGING DEVICE, CHARGING SYSTEM AND METHOD FOR CONTACTLESSLY CHARGING AN ENERGY ACCUMULATOR OF A MOTOR VEHICLE

FIELD

The disclosure relates to a contactless charging device for contactlessly charging an energy accumulator of a motor vehicle, wherein the contactless charging device has an interface for coupling the contactless charging device to a power source. The disclosure also includes a charging system with a contactless charging device and a method for contactlessly charging an energy accumulator of a motor vehicle.

BACKGROUND

Various measures for charging an energy accumulator, particularly a battery, of a motor vehicle are known from the prior art. These include both wired systems and contactless charging options. Wired charging methods provide greater charging capacities, whereby charging times can be shortened, while contactless charging options provide more convenience for the user, because no plug connection with the vehicle must be established manually by the user.

In order to keep charging times as short as possible, electric vehicles typically have a DC charging connection, by means of which these electric vehicles can be charged with capacities greater than 22 kW by means of a suitable DC charging device. In particular, the supply of power via said DC charging connection can take place by means of a charging station. Such charging stations enable charging with capacities in a range of from 50 kW to 150 kW and more. Essentially, it is also possible to charge an electric vehicle by means of alternating current. In contrast, the AC charging devices installed in the vehicle, however, usually only have a capacity in the single-digit kilowatt range. In order to also provide higher charging capacities in the private sphere, there are also DC charging devices nowadays in the form of wall boxes, i.e. wall charging devices, which range from 11 kW to 22 kW. Contactless charging systems, for example inductive charging systems, have capacities in a range of from 3.6 kW to 11 kW to the extent that significantly longer charging times result in this case as compared to wired DC charging. However, these contactless charging devices have the great advantage that a user does not have to manually establish a plug connection to the motor vehicle, which is thus significantly more convenient. Both the wall charging stations for home use as well as the contactless charging devices are very expensive. If a user wishes to have the option between quick charging and convenient charging at home, then the user requires both systems, which is very expensive. Thus, it is desirable to provide a user with this option in a more economical manner.

A contactless charging device for contactlessly charging an energy accumulator of a motor vehicle is described, for example, in US 2015/0115704 A1. Furthermore, DE 10 2016 116 914 A1 describes a system and a method for charging electrified vehicles, in which charging using a wired charging system is prioritized over a wireless charging system when electricity is available from both the wired charging system and the wireless charging system. Moreover, DE 10 2015 006 277 A1 describes an energy-transfer device and a device, to which inductively transferred electrical energy can be routed by means of the energy-transfer device.

SUMMARY

The object of the present invention is to provide a contactless charging device, a charging system, and a method for contactlessly charging an energy accumulator of a motor vehicle, which enables the most economical and flexible charging of the energy accumulator. In particular, economical and easy retrofitting of a contactless charging system should be enabled.

A contactless charging device for contactlessly charging an energy accumulator of a motor vehicle has an interface for coupling the contactless charging device to a power source, wherein the interface is designed for communicative coupling and for wired electrical coupling to a charging station, which, in turn, is designed for the wired charging of the energy accumulator.

It is thereby advantageously possible to supply the contactless charging device with power via a charging station for wired charging. This charging station may, in turn, be formed as a conventional wall box and/or wall charging station and be coupled to a power grid or it is capable of being coupled. In this case, the invention is based on the knowledge that when the contactless charging device is not directly coupled to the power grid but instead is supplied with power via a charging station for wired charging, numerous components can be eliminated such as, for example, protective devices and/or the grid interface such as, for example, fault-current circuit breakers, contactors, relays, grid filters, excess voltage protective device, etc. Such protective devices are already present in typical charging stations, particularly wall charging stations. The size and the costs for the contactless charging device are thereby significantly reduced. Thus, users who already have a wall charging station for home use can advantageously supplement and retrofit said charging station economically by means of a contactless charging option, which is provided by the contactless charging device. In addition, this offers the user advantageously as well the option of using the charging station directly for wired charging of the energy accumulator or instead to charge the energy accumulator contactlessly via the contactless charging device. Thus, the contactless charging device offers an especially economical and additionally flexible charging option for charging an energy accumulator of a motor vehicle.

The contactless charging device may furthermore be formed to implement the communication with the wall charging station via a standardized communication protocol of the wall charging station such as, for example, CCS2. The communication may be designed such that the wall charging station does not differentiate as to whether the motor vehicle is directly coupled to the wall charging station or the contactless charging device is instead. If the contactless charging device is used for charging, the motor vehicle then communicates with the contactless charging device, for example, via WLAN or Bluetooth, and the contactless charging device then communicates correspondingly with the wall charging station and can hereby begin the charging process, end the charging process, and request a corresponding charging voltage from the wall charging station. Accordingly, the contactless charging device may also have a wireless communication device for communication with the motor vehicle in order to communicate with the motor vehicle, for example, via WLAN or Bluetooth.

Furthermore, the contactless charging device may be designed, for example, as a capacitive or inductive charging device. If the contactless charging device is designed as a capacitive charging device, the contactless charging device provides a primary side, which can be capacitively coupled to a secondary side, which is installed in the motor vehicle. If the contactless charging device is designed as an inductive charging device, the charging device also provides a primary side in this case as well, for example in the form of a coil to which alternating current can be applied, it being possible to inductively couple said coil to a secondary side on the vehicle, which likewise has a coil for induction of an inductive current.

In a further advantageous embodiment of the invention, the contactless charging device is designed to be supplied with power by means of a power source designed as a DC charging station and/or AC charging station. In other words, the contactless charging device may be designed as a retrofit for a DC wall box or also for an AC wall box. In addition, it is also possible to design the contactless charging device such that it is suitable for both types of power sources, as is described in detail in the following. Especially advantageously in this case, the formation of the contactless charging device is such that it is supplied with power by means of a power source designed as a charging station, particularly is designed only for power supply by a DC charging station, because this enables an especially efficient and economical design of the contactless charging device. In particular, especially high charging capacities can be provided specifically by DC charging stations when they are directly connected to the motor vehicle to the extent that specifically this combination with the contactless charging device is especially advantageous. A user can thus select, in an especially convenient manner, between direct charging by means of the DC charging station with very short charging times or contactless charging by means of the contactless charging device.

For example, if the contactless charging device is designed for power supply by means of an AC charging station, the contactless charging device thus preferably comprises a rectifier, which converts the alternating current received by the AC charging station into direct-current. This direct-current is furthermore converted, by means of an inverter, into an alternating current with a suitable frequency, for example between 80 kHz and 90 kHz, which represents a preferred frequency range, specifically with respect to an inductive charging device. In this case, it is also advantageous when the contactless charging device additionally also comprises a power factor correction circuit and/or a power factor correction filter in order to prevent circuit feedback from the rectifier.

In contrast, if the contactless charging device is formed only for supplying power by means of a DC charging station, both the rectifier and the power factor correction circuit can be eliminated. In this case, it is thus sufficient when the contactless charging device has a rectifier which converts the direct voltage received by the DC charging station into an alternating current with a desired frequency for inductive or capacitive charging. Because components such as the rectifier or the power factor correction circuit can be eliminated with this embodiment, this enables an especially economical design of the contactless charging device.

However, the contactless charging device may also be designed such that it can be supplied with power by means of an AC charging station as well as by means of a DC charging station. To this end, the contactless charging device may be designed, as previously described, with a rectifier and a downstream inverter, wherein the rectifier circuit may furthermore be formed to be bypassed by means of a bypass circuit. Accordingly, the rectifier as well as the optional power factor correction circuit can be bypassed by means of a DC charging point or DC charging station, and the DC input voltage can be converted into the desired alternating voltage by means of the inverter. In contrast, if the contactless charging device is coupled to an AC charging station as the power source, the rectifier, including the corresponding power factor correction circuit, is thus not bypassed, whereby the AC input voltage is rectified and can be converted into an alternating voltage in the desired frequency by means of the downstream inverter.

The invention and its embodiments hereby provide many possible design options which, on the one hand, enable especially economical designs and, on the other hand, design options which are specially flexible and adapted to the situation.

Thus, it is advantageous when the charging device has at least one first converter device, particularly an inverter. Said device is designed to convert a direct voltage into an alternating voltage with a certain frequency, preferably between 80 kHz and 90 kHz, particularly 85 kHz. These frequency ranges are especially advantageous when combined with a contactless charging device designed as an inductive charging device.

In addition, it is advantageous, particularly when the contactless charging device is also intended to be capable of coupling to an AC charging station, when the charging device has at least one second converter device, particularly a rectifier. This device then enables an especially efficient operation when combined with an AC charging station.

In a further advantageous embodiment of the invention, the interface is a socket for coupling to a corresponding plug of the charging station, particularly a combo 2 plug. Alternatively, the interface may also comprise a socket as well as a plug as alternative inputs for supplying power. Typically, wall boxes comprise connection plugs for coupling to a corresponding socket of the motor vehicle. Accordingly, it is advantageous when the contactless charging device comprises precisely such a socket, as well as the motor vehicle. The combo 2 plug standard has become established through Europe. Thus, it is advantageous when the interface of the contactless charging device corresponds to such a standard. However, the interface may also be designed as a plug and/or socket according to a different standard. At least one signal line for communication with the charging station is also preferably integrated into this plug and/or into this socket.

In a further advantageous embodiment of the invention, the contactless charging device has an energy-transfer device, an interface device comprising the interface, and at least one electrical line which connects the interface device to the energy-transfer device. The energy-transfer device may be designed, for example, as a base plate. The energy-transfer device furthermore comprises an induction coil in the event that the contactless charging device is designed as an inductive charging device, or at least one capacitor plate in the event that the contactless charging device is designed as a capacitive charging device. If the energy-transfer device is designed, for example, as a base plate, it can be mounted or placed at any point on a supporting surface, for example in a garage. In particular, the contactless charging device may also be designed to be portable or mobile. In other words, the energy-transfer device designed as the base plate does not have to be permanently integrated into a supporting surface, which would also be conceivable, however. Alternatively, the energy-transfer device may also be designed as a wall module or wall plate for attachment to a wall which is situated on a supporting surface.

It is particularly especially advantageous when the interface device can be arranged separately from the energy-transfer device and is connected thereto via an electrical line. In other words, the interface, i.e. the socket for example, can be arranged at any point for coupling to the charging station, regardless of the arrangement and position of the energy-transfer device. Alternatively, the interface may also be integrated, for example, into the base plate. However, the former variant provides more flexibility.

In a further advantageous embodiment of the invention, the interface device comprises the first and/or second converter device and/or a control unit for controlling communication of the contactless charging device with the charging station and/or with the motor vehicle. In other words, the previously described converter devices can also be integrated into the plug interface. The electronics for communication via the standardized interface can also be situated in the interface device.

In an alternative embodiment, the energy-transfer device comprises the first and/or second converter device and/or a control unit for controlling communication of the contactless charging device with the charging station and/or with the motor vehicle. In other words, these components, meaning the described converter devices, as well as, in turn, the electronics for communication, may be arranged in the energy-transfer device itself, i.e. in the base plate, for example. The two variants advantageously enable corresponding components of the contactless charging device to either be integrated into the interface device or into the energy-transfer device depending on the installation space available. In turn, this provides an especially high degree of design options and application options. The integration, for example, into a base plate or generally into the energy-transfer device enables an especially compact design. On the other hand, the integration of these components into the interface device enables significantly improved accessibility of these components, for example for repairs.

Furthermore, the invention also relates to a charging system with a contactless charging device according to the invention or one of its embodiments. In addition, the charging system has a charging station for wired charging of the energy accumulator, which can be coupled to a power grid and which is designed to provide a definable starting voltage for supplying power to the contactless charging device.

The advantages described for the contactless charging device and its designs apply in a similar manner to the charging system according to the invention. Furthermore, as previously described, the charging station may be designed as a DC charging station or also as an AC charging station, particularly as a DC wall box or AC wall box. Such type of charging system enables a user to have an especially high degree of flexibility as relates to the charging options in an especially economical manner.

Furthermore, the invention also relates to a method for the contactless charging of an energy accumulator of a motor vehicle by means of a contactless charging device, which has an interface for coupling to a power source. The interface in this case is electrically and communicatively coupled to a charging station for wired charging of the energy accumulator. Moreover, the contactless charging device charges the energy accumulator, at least partially, by means of the power provided by means of the charging station on the contactless charging device via the interface.

The advantages described in reference to the contactless charging device according to the invention and the embodiments thereof apply in a similar manner to the method according to the invention. Moreover, the objective features listed in association with the charging device according to the invention and the embodiments thereof enable the refinement of the method according to the invention through further method steps. The invention also comprises the combinations of the described embodiments.

Further advantages, features, and details of the invention result from the following description of a preferred exemplary embodiment, as well as the drawing.

The exemplary embodiments explained in the following refer to preferred embodiments of the invention. With the exemplary embodiments, the described components of the embodiments represent individual features of the invention that are to be considered independently of one another, each of which also further develop the invention independently of one another and thus also are to be considered individually or in a combination that is different than the one shown as a component of the invention. Furthermore, the described embodiments can also be supplemented through further described features of the invention.

BRIEF DESCRIPTION OF THE DRAWING

FIG. 1 is a schematic representation of a charging system with a contactless charging device.

DETAILED DESCRIPTION

In this case, the only FIG. is a schematic representation of a charging system 10 with a contactless charging device 12 according to an exemplary embodiment of the invention.

The charging system 10 further comprises a wall charging station 14, which may be designed, for example, as a DC wall box or as an AC wall box. The contactless charging device 12 furthermore comprises a plug interface, meaning, i.e., an interface device 16 with a suitable interface 16a for coupling to the wall charging station 14, as well as an energy-transfer device 18. The energy-transfer device 18 may be provided in the form of a base plate, as shown here. Furthermore, the energy-transfer device 18 is designed in this example as an inductive energy-transfer device and thus comprises a primary coil 20, to which alternating current can be applied, in order to induce a current, via a resulting alternating magnetic field, into a secondary coil 22 of a motor vehicle 24. Due to the current thusly induced into the motor vehicle 24, an energy accumulator 26, for example an HV battery, of the motor vehicle 24 can be charged.

The power supply for providing the alternating current for the induction coil 20 of the energy-transfer device 18 in this case is advantageously provided by the wall charging station 14, whereby it is advantageously not necessary to couple the contactless charging device 12 directly to the power grid. The contactless charging device 12 thus ideally has only one inverter 28 with an upstream intermediate circuit. In contrast, electrical components specific to the power grid can be eliminated such as, for example, rectifiers, a power factor correction circuit, contactors, relays, grid filters, excess voltage protective device, etc. These components are already integrated into the charging station 14 and are thus not again required for the contactless charging device 12. Thus, an existing wall charging station 14 can be retrofitted in an especially economical manner by means of an inductive or generally contactless charging option, which is enabled by means of the contactless charging device 12 according to the invention or one of its embodiments.

The communicative and electrical coupling between the charging station 14 and the charging device 12 takes place by means of a standardized interface such as, for example, a combo 2 plug-socket combination. In this example, the charging device 12 has an interface 16a designed as a socket, into which a corresponding plug 30 of the charging station 14 can be inserted. The communicative coupling is also simultaneously implemented via this plug-socket combination. The communication in this case may likewise take place by means of a standardized protocol, for example CCS2.

The charging device 12 in this case can communicate with both the motor vehicle 24, for example via WLAN, and with the charging station 14. The charging process can be controlled, particularly started and ended, and a charge voltage can be specifically requested by the charging station 14 via this communication. In this case, this does not necessarily have to match the battery voltage of the battery 26 of the motor vehicle 24. For example, a charging capacity between 3.6 kW and 11 kW can be provided by means of the charging device 12. For example, if the user wishes to have a greater charging capacity in a situation, the user advantageously has the option of charging the vehicle directly via the charging station 14 by simply plugging in the plug 30 of the charging station 14 for direct coupling to the motor vehicle 24, whereby a charging capacity, for example, of 22 kW or more can then be provided. To this end, the motor vehicle 24 particularly has the same socket 32 as the interface 16a.

The interface device 16 is furthermore connected to the energy-transfer device 18 via a line 34. Thus, the interface device 16 can hereby be arranged at any point regardless of the energy-transfer device 18, which provides a high degree of flexibility. Alternatively, the interface device 16 could also be integrated into the base plate 18. The inverter 28 can also alternatively be integrated directly into the interface device 16. Furthermore, the charging device 12 also has electronics for communication with the motor vehicle 24 and/or the charging station 14, which can likewise be integrated into the interface device 16 or into the energy-transfer device 18. If the charging device 12, for example, should also be designed for power supply by an AC charging station, the charging device 12 then additionally comprises a rectifier and a power factor correction circuit.

As a whole, a contactless charging device which provides an expansion to existing charging stations is provided by the invention in an especially efficient and economical manner.

The invention claimed is:

1. A contactless charging device for contactlessly charging an energy accumulator of a motor vehicle, the contactless charging device comprising:
an interface for coupling the contactless charging device to a power source, the power source comprising at least one of a wall unit and a charging station, and
an energy-transfer device for contactlessly exchanging electricity with the motor vehicle,
wherein the power source is designed for wired charging of the energy accumulator,
wherein the contactless charging device further comprises a rectifier circuit, an inverter arranged downstream of the rectifier circuit, and a bypass circuit configured to bypass the rectifier circuit,
wherein the bypass circuit is open when the power source provides alternating current and the bypass circuit is closed when the power source provides direct current, and
wherein the interface is designed for both communicative and wired electrical coupling to the power source.

2. The contactless charging device according to claim 1, wherein the inverter is designed to output an alternating voltage with a frequency between 80 kHz and 90 kHz for contactlessly exchanging electricity with the motor vehicle.

3. The contactless charging device according to claim 1, wherein the contactless charging device further comprises a power factor correction circuit.

4. The contactless charging device according to claim 1, wherein the interface has a socket for coupling to a corresponding plug of the power source.

5. The contactless charging device according to claim 1, wherein the energy-transfer device is connected to the interface by an electrical line.

6. The contactless charging device according to claim 5, wherein the inverter is arranged in the interface, and
wherein the interface further comprises a control unit for controlling a communication of the contactless charging device with the power source and/or with the motor vehicle.

7. The contactless charging device according to claim 5, wherein the inverter is arranged in the energy-transfer device, and
wherein the energy-transfer device further comprises a control unit for controlling a communication of the contactless charging device with the power source and/or with the motor vehicle.

8. A charging system with the contactless charging device according to claim 1,
wherein the charging system has a charging station for wired charging of the energy accumulator as the power source, and
wherein the charging station is coupleable to a power grid and is designed to provide a definable starting voltage for supplying power to the contactless charging device.

9. A method for contactlessly charging an energy accumulator of a motor vehicle by a contactless charging device, comprising:
connecting the contactless charging device to a power source, the power source comprising at least one of a wall unit and a charging station, and
charging the energy accumulator contactlessly, at least partially, by way of power supplied to the contactless charging device from the power source,
wherein the contactless charging device comprises:
an interface for coupling the contactless charging device to the power source, and
an energy-transfer device for contactlessly exchanging electricity with the motor vehicle,
wherein the contactless charging device further comprises a rectifier circuit, an inverter arranged downstream of the rectifier circuit, and a bypass circuit configured to bypass the rectifier circuit,
wherein the bypass circuit is open when the power source provides alternating current and the bypass circuit is closed when the power source provides direct current, and
wherein the interface is designed for both communicative and wired electrical coupling to the power source.

10. The contactless charging device according to claim 1, wherein the energy-transfer device comprises at least one of a base plate and a capacitor plate, and
wherein the energy-transfer device is portable.

11. The contactless charging device according to claim 1, wherein the interface is integrated with the energy-transfer device.

12. The contactless charging device according to claim 1, wherein the inverter is designed to output an alternating voltage with a frequency of approximately 85 kHz for contactlessly exchanging electricity with the motor vehicle.

\* \* \* \* \*